(12) United States Patent
Takeda

(10) Patent No.: US 10,831,026 B2
(45) Date of Patent: Nov. 10, 2020

(54) DISPLAY APPARATUS

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 99 days.

(21) Appl. No.: 15/522,254

(22) PCT Filed: Oct. 26, 2015

(86) PCT No.: PCT/JP2015/005356
§ 371 (c)(1),
(2) Date: Apr. 26, 2017

(87) PCT Pub. No.: WO2016/067583
PCT Pub. Date: May 6, 2016

(65) Prior Publication Data
US 2017/0315360 A1 Nov. 2, 2017

(30) Foreign Application Priority Data

Oct. 29, 2014 (JP) ................. 2014-220042

(51) Int. Cl.
G02B 27/01 (2006.01)
G02B 5/32 (2006.01)
G02B 27/00 (2006.01)
G02B 27/10 (2006.01)
(Continued)

(52) U.S. Cl.
CPC .......... *G02B 27/0172* (2013.01); *G02B 5/32* (2013.01); *G02B 27/0081* (2013.01);
(Continued)

(58) Field of Classification Search
CPC ............. G02B 27/0172; G02B 27/14; G02B 27/0081; G02B 27/104; G02B 27/1086;
(Continued)

(56) References Cited

U.S. PATENT DOCUMENTS 6,094,283 A 7/2000 Preston
6,429,968 B1 * 8/2002 Carver ............ G01J 3/02
250/458.1
(Continued)

FOREIGN PATENT DOCUMENTS

JP 2001-194617 A 7/2001
JP 2005-173159 A 6/2005
(Continued)

OTHER PUBLICATIONS

Dec. 22, 2015 Search Report issued in International Patent Application No. PCT/JP2015/005356.

Primary Examiner — Jade R Chwasz
(74) Attorney, Agent, or Firm — Oliff PLC

(57) ABSTRACT

A retina scanning type display apparatus includes a scanning portion, a deflection member, and a light flux diameter expanding element. An incidence angle range in a first incidence direction with respect to an eye from the deflection member is broader than an incidence angle range in a second incidence direction, and, in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction. In addition, in the scanning mirror, a width in a first scanning direction, which corresponds to the first expanding direction, is narrower than a width in a second scanning direction, which corresponds to the second expanding direction.

15 Claims, 4 Drawing Sheets

(51) Int. Cl.
*G02B 27/14* (2006.01)
*G02B 27/42* (2006.01)
*G02B 26/10* (2006.01)
*H04N 9/31* (2006.01)

(52) U.S. Cl.
CPC ....... *G02B 27/104* (2013.01); *G02B 27/1086* (2013.01); *G02B 27/14* (2013.01); *G02B 26/101* (2013.01); *G02B 27/4227* (2013.01); *G02B 2027/013* (2013.01); *G02B 2027/0123* (2013.01); *G02B 2027/0174* (2013.01); *G02B 2027/0178* (2013.01); *H04N 9/3135* (2013.01); *H04N 9/3161* (2013.01); *H04N 9/3164* (2013.01)

(58) Field of Classification Search
CPC .............. G02B 5/32; G02B 2027/0123; G02B 2027/013; G02B 2027/0178; G02B 26/101; G02B 2027/0174; G02B 27/4227; H04N 9/3164; H04N 9/3135; H04N 9/3161
USPC ......................... 359/14, 13, 15, 17
See application file for complete search history.

(56) References Cited

U.S. PATENT DOCUMENTS

| | | | |
|---|---|---|---|
| 2003/0189742 A1* | 10/2003 | Kobayashi | G02B 26/101 359/202.1 |
| 2007/0171370 A1 | 7/2007 | Watanabe | |
| 2008/0174878 A1* | 7/2008 | Kobayashi | G02B 26/105 359/630 |
| 2013/0077175 A1 | 3/2013 | Hotta et al. | |
| 2014/0177017 A1* | 6/2014 | Kubota | G02B 27/0103 359/13 |

FOREIGN PATENT DOCUMENTS

| | | |
|---|---|---|
| JP | 2005-292191 A | 10/2005 |
| JP | 2005-292254 A | 10/2005 |
| JP | 2006-098570 A | 4/2006 |
| JP | 2008-046217 A | 2/2008 |
| JP | 2008-083246 A | 4/2008 |
| JP | 2011-075951 A | 4/2011 |
| JP | 2013-073070 A | 4/2013 |
| WO | 2013/030978 A1 | 3/2013 |

* cited by examiner

FIG. 1
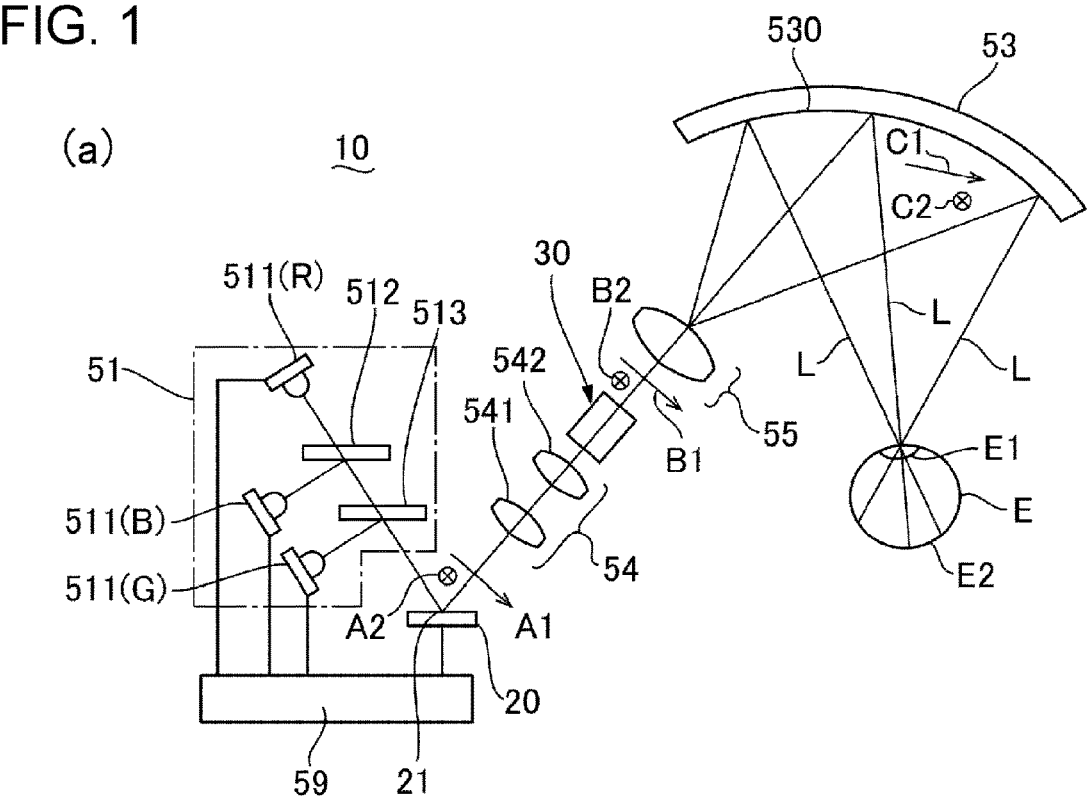
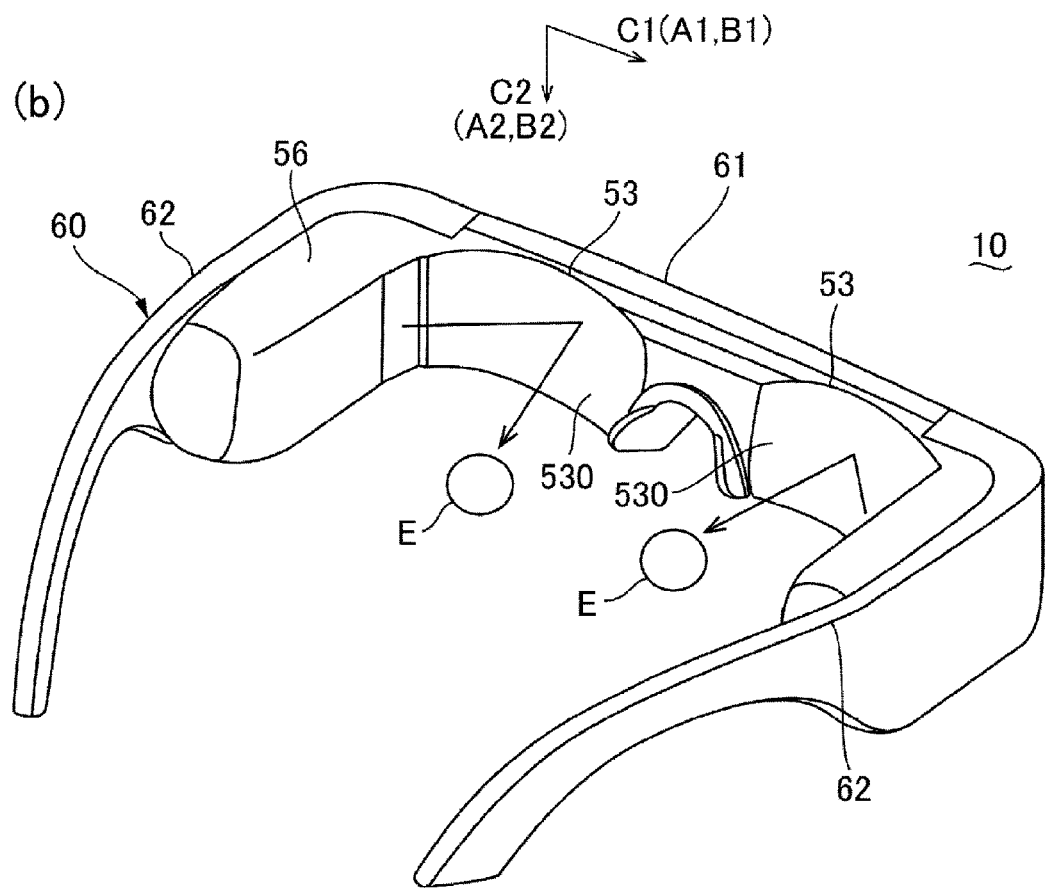

FIG. 3
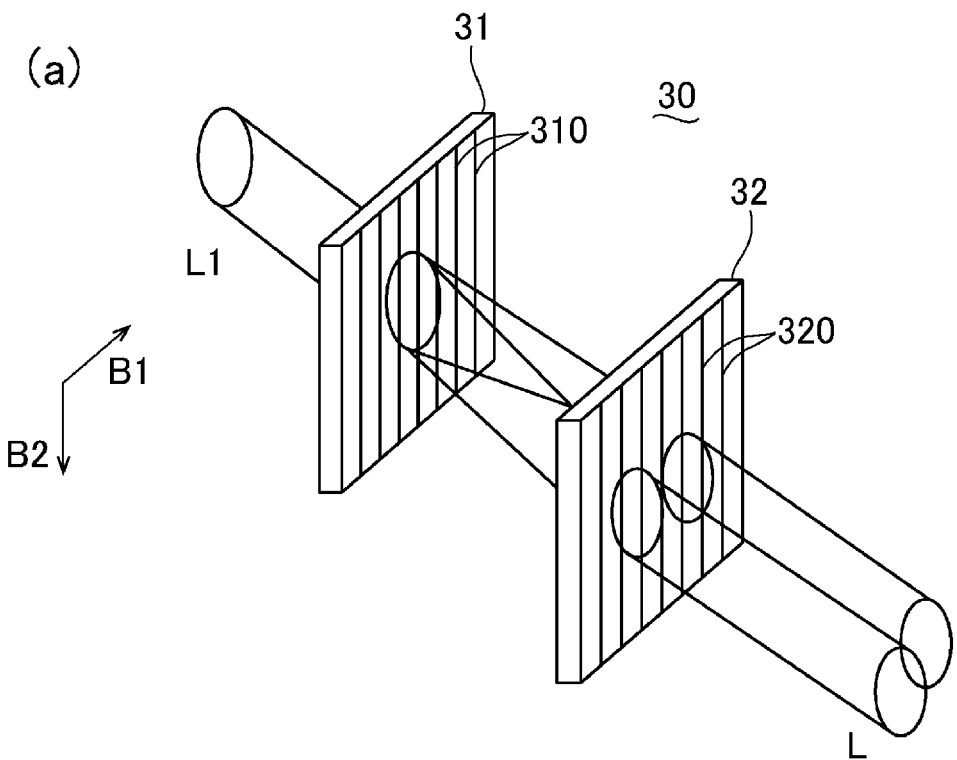
(a)
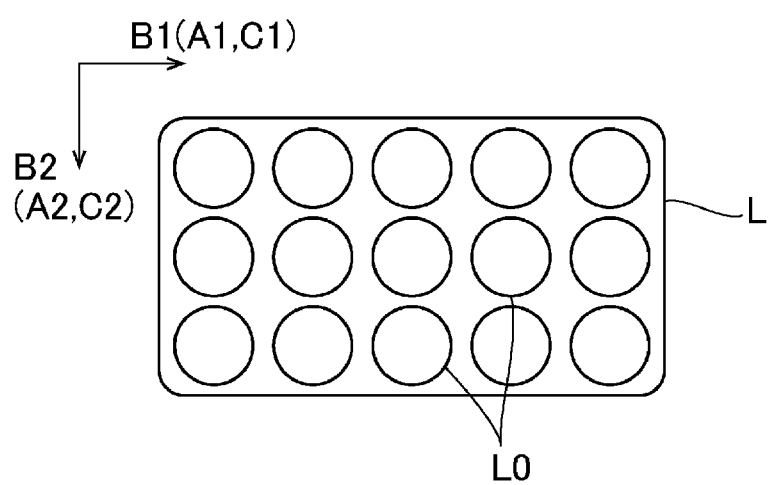
(b)

FIG. 4
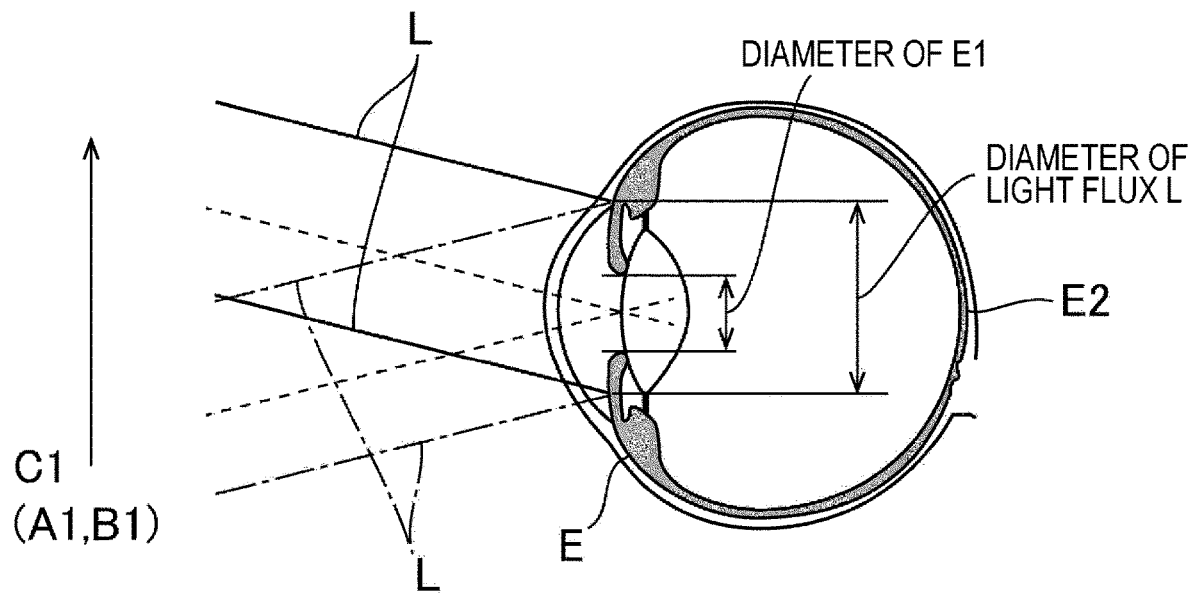
(a)
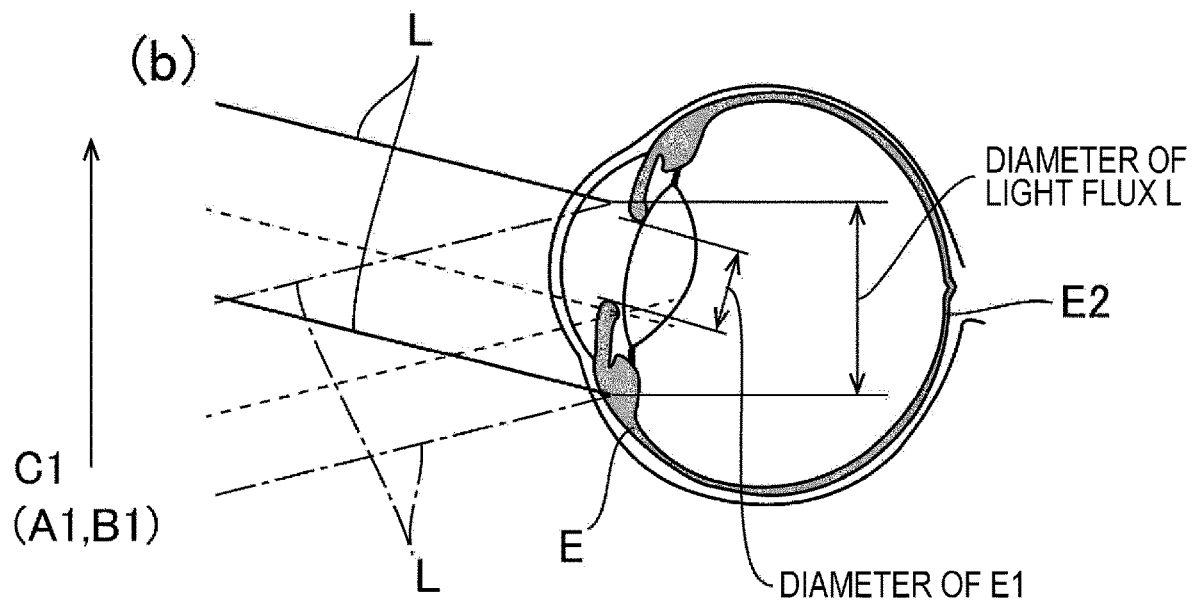
(b)

DISPLAY APPARATUS

TECHNICAL FIELD

The present disclosure relates to a display apparatus.

BACKGROUND ART

In a retina scanning type display apparatus that causes an optically modulated light flux to be incident to an eye of an user, a light source portion that emits a light flux for displaying an image, a scanning portion provided with a scanning mirror that scans with the light flux emitted from the light source portion in two directions, and a deflection light member that deflects the light flux with which the scanning portion scans and causes the light flux to be incident to the eye of the user, are provided. In addition, in a retina scanning type display apparatus, if a light flux is small, since the light flux is not incident to a pupil in a case in which the position of the pupil changes, chipping, and the like, of an image occurs. In such an instance, in a retina scanning type display apparatus, a light flux diameter expanding element (a pupil dilation element) such as a diffraction element is provided in an optical path that reaches from the scanning portion to a deflection member (PTL 1).

In addition, in a retina scanning type display apparatus, a technique that changes the expanding magnification of a light flux diameter expanding element (a pupil dilation element) depending on the level of proficiency of an user, has been proposed (PTL 2).

CITATION LIST

Patent Literature

PTL 1: Japanese Unexamined Patent Application Publication No. 2008-46217
PTL 2: Japanese Unexamined Patent Application Publication No. 2011-75951

SUMMARY OF INVENTION

Technical Problem

In a retina scanning type display apparatus, there is an issue in that an image is chipped in a case in which the size of an image that is recognized by an user is large, and retina scanning type display apparatus-specific issues such as a deterioration in the image appearance quality caused by inertia when a scanning mirror is driven, occur, but the corresponding issues and techniques for resolving them are not disclosed in PTLs 1 and 2.

For example, as shown in FIG. 4(a), in a case in which an eye E is directed toward a front surface, light fluxes L that are equivalent to both ends of an image are also incident to a pupil E1. In contrast to this, as shown in FIG. 4(b), if the eye E is directed toward one direction when an attempt is made to view one end of the image, a light flux L that is equivalent to the other end of the image is not sufficiently incident to the pupil E1, and therefore, chipping of the image, and the like, occurs. However, expanding of the light flux L is not disclosed in PTLs 1 and 2 as a technique for resolving the corresponding issue.

In addition, when a scanning mirror is driven at high speed in the scanning portion, scanning with the light flux becomes irregular due to inertia of the scanning mirror, but the corresponding issue and a technique for resolving the corresponding issues are not disclosed in PTLs 1 and 2.

In the light of the above-mentioned issues, the problem of the embodiment is to provide a configuration that can resolve retina scanning type display apparatus-specific issues.

Solution to Problem

In order to solve the above-mentioned problem, firstly, as a retina scanning type display apparatus-specific problem, providing a display apparatus that can cause a light flux, which corresponds to another end of an image to be incident to a pupil even in a case in which an eye is directed toward one direction, is set as a problem, and the following configuration is included. That is, an aspect of a display apparatus according to the embodiment includes a light source portion that emits a light flux for displaying an image, a scanning section provided with a scanning mirror that scans with the light flux emitted from the light source portion in a first scanning direction and a second scanning direction that intersects the first scanning direction, a deflection member that deflects the light flux with which the scanning portion scans, and causes the light flux to be incident to an eye of a user so as to incline along with a first incidence direction, which corresponds to the first scanning direction, and a second incidence direction, which corresponds to the second scanning direction; and a light flux diameter expanding element that expands the diameter of the light flux in an optical path that reaches from the scanning portion to the deflection member, in which an incidence angle range with respect to the eye in the first incidence direction is broader than an incidence angle range with respect to the eye in the second incidence direction, and in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction.

In the embodiment, in order to correspond to a configuration in which the incidence angle range in the first incidence direction is broader than the incidence angle range in the second incidence direction, in the light flux diameter expanding element, the expanding magnification of light flux diameter in the first expanding direction is greater than the expanding magnification of light flux diameter in the second expanding direction. Therefore, even in a case in which the eye is directed toward one end in the first incidence direction, it is possible to cause a light flux that is equivalent to the other end in the first incidence direction of an image, to be incident to the pupil.

In the embodiment, for example, the first incidence direction is a lateral direction in which both eyes are aligned, and the second incidence direction is the longitudinal direction that is orthogonal to a direction in which both eyes are aligned. There are many cases in which the horizontal length of an image that is recognized by an user is longer, and in such a case, the eye moves greatly in a case in which the eye is directed toward one end in the first incidence direction (the lateral direction). Even in such a case, it is possible to cause a light flux that is equivalent to the other end in the first incidence direction (the lateral direction) of an image, to be incident to the pupil.

In the embodiment, in the scanning mirror, it is preferable that a width in the first scanning direction be narrower than a width in the second scanning direction. In a case of the corresponding configuration, the diameter of a light flux emitted from the scanning mirror is small in the first scanning direction, but since the light flux diameter expanding element greatly expands the diameter in the first expanding direction, which corresponds to the first scanning direction, the diameter of the light flux is made sufficiently large in two directions.

In the embodiment, in the scanning portion, it is preferable that a driving frequency of the scanning mirror in the first scanning direction be higher than a driving frequency of the scanning mirror in the second scanning direction. Even in such a case, in the scanning mirror, since the width in the first scanning direction is narrow, the inertia of the scanning mirror during scanning in the first scanning direction is small. Accordingly, since it is unlikely that a circumstance in which scanning becomes irregular due to the effects of inertia of the scanning mirror during scanning of the scanning mirror in the first scanning direction, will occur, it is possible to suppress a deterioration in the image appearance quality caused by inertia of the scanning mirror.

In the embodiment, for example, in the light flux diameter expanding element, it is preferable that the expanding magnification of light flux diameter in the first expanding direction exceed 1X, and the expanding magnification of light flux diameter in the second expanding direction be 1X. According to the corresponding configuration, since it is not necessary for the light flux diameter expanding element to expand the light flux diameter in the second expanding direction, it is possible to achieve miniaturization and cost-reduction in the light flux diameter expanding element.

In addition, as a retina scanning type display apparatus-specific problem, providing a display apparatus that is unlikely to be subjected to the inertia of the scanning mirror, is set as a problem, and the following configuration is included. That is, another aspect of a display apparatus according to the embodiment includes a light source portion that emits a light flux for displaying an image, a scanning section provided with a scanning mirror that scans with the light flux emitted from the light source portion in a first scanning direction and a second scanning direction that intersects the first scanning direction, a deflection member that deflects the light flux with which the scanning portion scans, and causes the light flux to be incident to an eye of a user so as to incline along with a first incidence direction, which corresponds to the first scanning direction, and a second incidence direction, which corresponds to the second scanning direction; and a light flux diameter expanding element that expands the diameter of the light flux in an optical path that reaches from the scanning portion to the deflection member, in which, in the scanning portion, a driving frequency of the scanning mirror in the first scanning direction is higher than a driving frequency of the scanning mirror in the second scanning direction, and in the scanning mirror, a width in the first scanning direction is narrower than a width in the second scanning direction.

In the embodiment, in order to correspond to a configuration in which the driving frequency of the scanning mirror in the first scanning direction is higher than the driving frequency of the scanning mirror in the second scanning direction, in the scanning mirror, the width in the first scanning direction is narrower than the width in the second scanning direction. Therefore, in the scanning mirror, the inertia of the scanning mirror during scanning in the first scanning direction is small. Accordingly, since it is unlikely that a circumstance in which scanning becomes irregular due to the effects of inertia of the scanning mirror during scanning of the scanning mirror in the first scanning direction, will occur, it is possible to suppress a deterioration in the image appearance quality caused by inertia of the scanning mirror.

In the embodiment, for example, the first incidence direction is a lateral direction in which both eyes are aligned, and the second incidence direction is a longitudinal direction that is orthogonal to the direction in which both eyes are aligned. There are many case in which the horizontal length of an image that is recognized by an user is longer, and in such a case, there are often cases in which a configuration in which the driving frequency of the scanning mirror in the first scanning direction is higher than the driving frequency of the scanning mirror in the second scanning direction, is adopted, but even in this case, it is possible to suppress a deterioration in the image appearance quality caused by the inertia of the scanning mirror.

In the embodiment, it is preferable that, in the light flux diameter expanding element, an expanding magnification of light flux diameter in a first expanding direction, which corresponds to the first incidence direction, be greater than an expanding magnification of light flux diameter in a second expanding direction, which corresponds to the second incidence direction. In a case in which the width in the first scanning direction of the scanning mirror is narrower than the width in the second scanning direction, the diameter of a light flux emitted from the scanning mirror is small in the first scanning direction, but since the light flux diameter expanding element greatly expands the diameter in the first expanding direction, which corresponds to the first scanning direction, the diameter of the light flux is made sufficiently large in two directions. In addition, the eye moves greatly in a case in which the eye is directed toward one end in the first incidence direction, and even in such a case, it is possible to cause a light flux that is equivalent to the other end in the first incidence direction of an image, to be incident to the pupil.

In the embodiment, for example, in the light flux diameter expanding element, it is preferable that the expanding magnification of light flux diameter in the first expanding direction exceed 1X, and the expanding magnification of light flux diameter in the second expanding direction be 1X. According to the corresponding configuration, since it is not necessary for the light flux diameter expanding element to expand the light flux diameter in the second expanding direction, it is possible to achieve miniaturization and cost-reduction in the light flux diameter expanding element.

In the embodiment, for example, in the light flux diameter expanding element, it is preferable that the expanding magnification of light flux diameter in the first expanding direction exceed 1X, and the expanding magnification of light flux diameter in the second expanding direction be 1X. According to the corresponding configuration, since it is not necessary for the light flux diameter expanding element to expand the light flux diameter in the second expanding direction, it is possible to achieve miniaturization and cost-reduction in the light flux diameter expanding element.

In addition, as a retina scanning type display apparatus-specific problem, providing a display apparatus in which a light flux diameter is appropriate as a result of appropriately adjusting a configuration of the light flux diameter expanding element to correspond to the shape of the scanning mirror, is set as a problem, and the following configuration is included. That is, still another aspect of a display apparatus according to the embodiment includes a light source portion that emits a light flux for displaying an image, a scanning section provided with a scanning mirror that scans with the light flux emitted from the light source portion in a first scanning direction and a second scanning direction that intersects the first scanning direction, a deflection member that deflects the light flux with which the scanning portion scans, and causes the light flux to be incident on an eye of a user so as to incline along with a first incidence direction, which corresponds to the first scanning direction, and a second incidence direction, which corresponds to the second scanning direction; and a light flux diameter expanding element that expands the diameter of the light flux in an optical path that reaches from the scanning portion to the deflection member, in which, in the scanning mirror, a width in the first scanning direction is narrower than a width in the second scanning direction, and in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction.

In the embodiment, in order to match a configuration in which, in the scanning mirror, the width in the first scanning direction is narrower than the width in the second scanning direction, in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction. Accordingly, the diameter of a light flux emitted from the scanning mirror is small in the first scanning direction, but since the light flux diameter expanding element greatly expands the diameter in the first expanding direction, which corresponds to the first scanning direction, the diameter of the light flux is made sufficiently large in two directions.

In the embodiment, for example, the first incidence direction is a lateral direction in which both eyes are aligned, and the second incidence direction is a longitudinal direction that is orthogonal to the direction in which both eyes are aligned. There are many cases in which the horizontal length of an image that is recognized by an user is longer, and in such a case, there are often cases in which a configuration in which the driving frequency of the scanning mirror in the first scanning direction is higher than the driving frequency of the scanning mirror in the second scanning direction, is adopted, but even in this case, it is possible to suppress a deterioration in the image appearance quality caused by the inertia of the scanning mirror. In addition, the eye moves greatly in a case in which the eye is directed toward one end in the first incidence direction (a lateral direction), and even in such a case, it is possible to cause a light flux that is equivalent to the other end in the first incidence direction (the lateral direction) of an image, to be incident to the pupil.

In the embodiment, for example, in the light flux diameter expanding element, it is preferable that the expanding magnification of light flux diameter in the first expanding direction exceed 1X, and the expanding magnification of light flux diameter in the second expanding direction be 1X. According to the corresponding configuration, since it is not necessary for the light flux diameter expanding element to expand the light flux diameter in the second expanding direction, it is possible to achieve miniaturization and cost-reduction in the light flux diameter expanding element.

In the embodiment, it is preferable that the deflection member be provided with a reflective surface having a concave curved surface. According to the corresponding configuration, it is possible to reliably reflect light toward the eye of the user using a simple configuration.

In the embodiment, it is preferable that the deflection member be a partially transmissive reflective combiner.

According to the corresponding configuration, it is possible to configure a see-through type head mounted display (an eye glass display), and therefore, it is possible to simultaneously view external light that is transmitted by a combiner, and image light that is incident from a pupil of an eye of an user.

In the embodiment, the deflection member may be a hologram that deflects light incident thereto using diffraction.

BRIEF DESCRIPTION OF DRAWINGS

FIG. 1 is an explanatory diagram that shows an aspect of a retina scanning type display apparatus in which the embodiment is applied.

FIG. 3 is an explanatory diagram that shows an aspect of a light flux diameter expanding element that is used in a display apparatus in which the embodiment is applied.

FIG. 4 is an explanatory view that shows a state in which a light flux is incident to a pupil.

DESCRIPTION OF EMBODIMENTS

Figure 2:
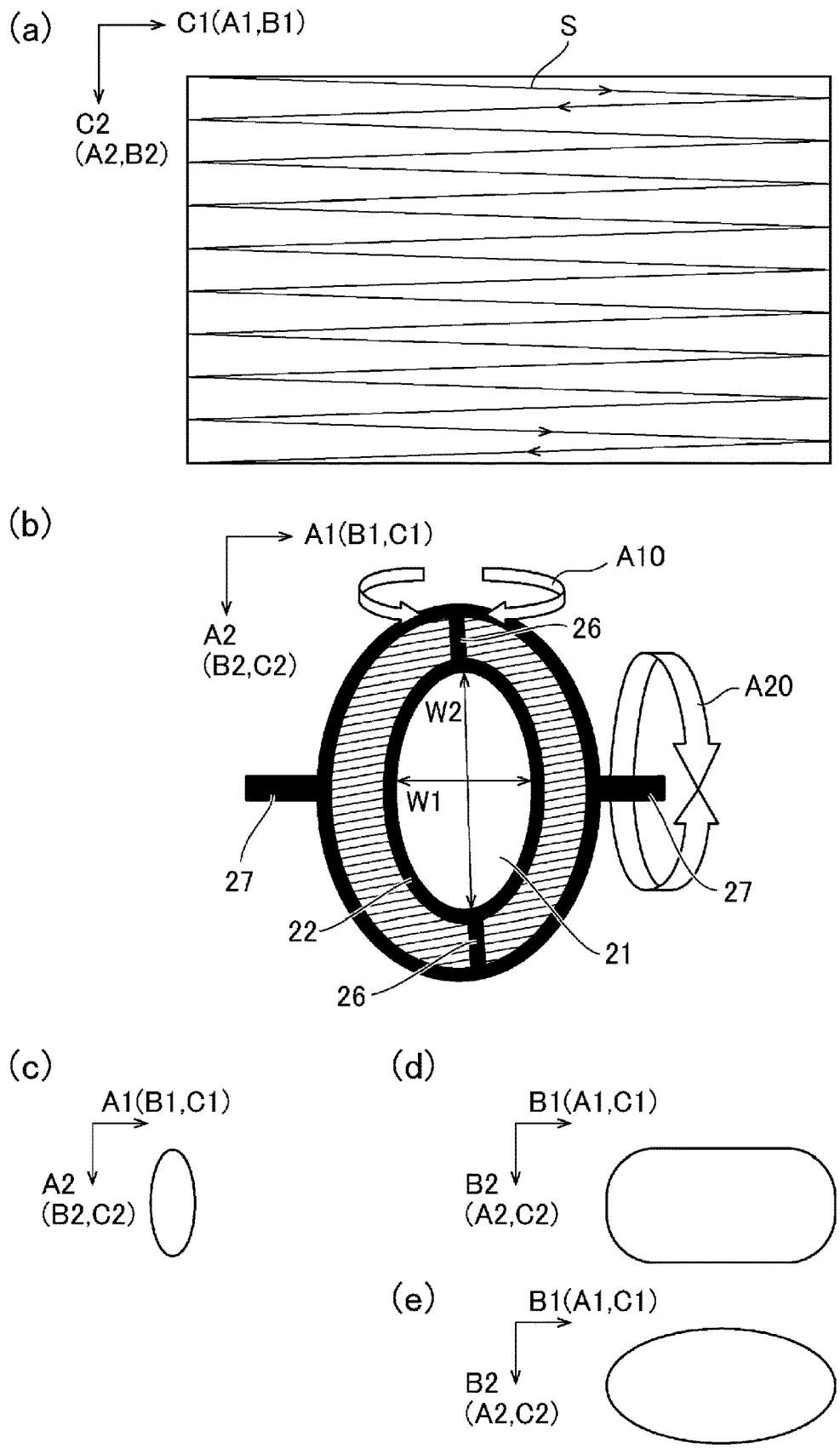
FIG. 2 is an explanatory diagram that shows an aspect of a detailed configuration of a display apparatus in which the embodiment is applied.

Hereinafter, an embodiment of the invention will be described.

(Configuration of Retina Scanning Type Display Apparatus)

FIG. 1 is an explanatory diagram that shows an aspect of a retina scanning type display apparatus 10 in which the embodiment is applied, and FIGS. 1(a) and (b) are respectively an explanatory view that shows an aspect of an optical system and an explanatory view that shows an aspect of an appearance of the display apparatus 10.

In FIG. 1(a), the display apparatus 10 includes a light source portion 51 that emits a light flux for displaying an image, a scanning portion 20 provided with a scanning mirror 21 that scans with the light flux emitted from the light source portion 51, and a deflection member 53 that deflects the light flux with which the scanning portion scans 20 and causes the light flux to be incident to an eye E of an user. In addition, the display apparatus 10 includes a relay lens system 54 and a projection lens system 55 on an emission side from the scanning portion 20. The relay lens system 54 is, for example, configured by two relay lenses 541 and 542. In the present aspect, the deflection member 53 is a reflective member. Additionally, a hologram that deflects light incident thereto using diffraction may be used as the deflection member 53.

The light source portion 51 emits light source light prior to optical modulation or modulated light that has been optically modulated. In the present aspect, the light source portion 51 is configured as a modulated light emission portion that emits modulated light that has been optically modulated. More specifically, the light source portion 51 includes a red laser element 511 (R) that emits red light (R), a green laser element 511 (G) that emits green light (G) and a blue laser element 511 (B) that emits blue light (B), and includes two half mirrors 512 and 513 that synthesize optical paths of the laser elements. The red laser element 511 (R), the green laser element 511 (G) and the blue laser element 511 (B) emit luminous fluxes which are modulated to have optical intensities that correspond to each dot of an image to be displayed according to the control of a control portion 59.

The scanning portion 20 scans incidence light in a first scanning direction A1 and a second scanning direction A2 that intersects the first scanning direction A1, and the scanned light is projected onto the deflection member 53 via the relay lens system 54 and the projection lens system 55. The operations of the corresponding scanning portion 20 are also implemented according to the control of the control portion 59. The scanning portion 20 can, for example, be realized using a micromirror device formed with the MEMS (Micro Electro Mechanical Systems) technique using a silicon substrate or the like.

In the present aspect, the display apparatus 10 is configuration as a retina scanning method projection type display device. Therefore, the deflection member 53 is provided with a reflective surface 530 having a concave curved surface form that reflects a projected light flux L and causes the light flux L to be incident to the eye E of the user. In such a display apparatus 10 (a retina scanning method projection type display apparatus), an image is recognized by an user as a result of a light flux, which is scanned in the first scanning direction A1 and the second scanning direction A2 that intersects the first scanning direction A1 by the scanning portion 20, being reflected in a first incidence direction C1, which corresponds to the first scanning direction A1, and a second incidence direction C2, which corresponds to the second scanning direction A2, by the reflective surface 530 of the deflection member 53 and arriving at a retina E2 via a pupil E1. In the present aspect, the deflection member 53 is a partially transmissive reflective combiner. Therefore, since external light is also incident to the eye via the deflection member 53 (the combiner), it is possible for a user to recognize an image in which an image formed by the display apparatus 10 and external light (a background) are superimposed. That is, the display apparatus 10 is configured as a see-through type retina scanning type projection apparatus.

In addition, in the display apparatus 10, a light flux diameter expanding element 30 is disposed in an optical path that reaches from the scanning portion 20 to the deflection member 53, and the light flux diameter expanding element 30 expands a light flux emitted from the scanning portion 20 in a first expanding direction B1, which corresponds to the first scanning direction A1 (the first incidence direction C1), and a second expanding direction B2, which corresponds to the second scanning direction A2 (the second incidence direction C2). In the present aspect, the light flux diameter expanding element 30 may be disposed in any one position of between the scanning portion 20 and the relay lens 541, between the two relay lenses 541 and 542, or between the relay lens 542 and the projection lens system 55, and in the present aspect, is disposed between the relay lens 542 and the projection lens system 55.

In a case in which a display apparatus 10 configuration in this manner is configured as a see-through type head mounted display (an eye glass display), as shown in FIG. 1(b), the display apparatus 10 is formed in a shape such as that of a pair of eye glasses. In addition, in a case of respectively causing modulated light to be incident to the left and right eyes E of an observer, the display apparatus 10 includes a left eye deflection member 53 and a frame 60 that supports the left eye deflection member 53 using a front section 61, and an optical unit 56 that includes an optical component that has been described with reference to FIG. 1(a), is provided at each of a left and right temple 62 of the frame 60. In this instance, in addition to all of the light source portion 51, the scanning portion 20, the relay lens system 54, the light flux diameter expanding element 30, and the projection lens system 55 being provided in the optical unit 56, only the scanning portion 20, the relay lens system 54, the light flux diameter expanding element 30, and the projection lens system 55 may be provided in the optical unit 56, and the optical unit 56 and the light source portion 51 may be connected using an optical cable, or the like. In addition, in the optical unit 56, among the light source portion 51, the scanning portion 20, the relay lens system 54, the light flux diameter expanding element 30 and the projection lens system 55, for example, a configuration that excludes the relay lens system 54 may be set, and the light flux diameter expanding element 30 may be disposed between the scanning portion 20 and the projection lens system 55.

In the display apparatus 10 of the present aspect, in an image that is recognized by an user, the first incidence direction C1 of the light flux L from the deflection member 53 corresponds to a lateral direction in which both eyes are aligned, and therefore, the first scanning direction A1 in the scanning portion 20 and the first expanding direction B1 in the light flux diameter expanding element 30 correspond to the lateral direction of an image. In addition, the second first incidence direction C2 of the light flux L from the deflection member 53 corresponds to a longitudinal direction that intersects the lateral direction in which both eyes are aligned, and therefore, the second scanning direction A2 in the scanning portion 20 and the second expanding direction B2 in the light flux diameter expanding element 30 correspond to the longitudinal direction of an image. Accordingly, in the following description, the scanning directions in the scanning portion 20 and the expanding directions in the light flux diameter expanding element 30 will also be written as the "lateral direction" and the "longitudinal direction" as appropriate, and the "lateral direction" and the "longitudinal direction" in this case refer to directions that correspond to a "lateral direction" and a "longitudinal direction" of an image that is recognized by an user.

(Detailed Configuration of Display Apparatus 10)

FIG. 2 is an explanatory diagram that shows an aspect of a detailed configuration of the display apparatus 10 in which the embodiment is applied, and FIGS. 2(a), (b), (c), (d), and (e) are respectively an explanatory view that shows a scanning direction of a light flux in the scanning portion 20, an explanatory view that shows an aspect of a specific configuration of the scanning portion 20, an explanatory view that shows a diameter of a light flux emitted from the scanning portion 20, an explanatory view that shows an aspect of an expanding magnification of a light flux using a light flux diameter expanding element, and an explanatory view that shows another aspect of an expanding magnification of a light flux using a light flux diameter expanding element.

In the display apparatus 10 of the present aspect, an angle range in the first incidence direction C1 of the light flux L from the deflection member 53 is broader than an angle range in the second incidence direction C2. Therefore, as shown in FIG. 2(a), an image that is recognized by an user, is a horizontally long image in which the size in the lateral direction (the first incidence direction C1) is greater than the size in the longitudinal direction (the second incidence direction C2). In this instance, for example, a ratio of the size in the lateral direction of an image to the size in the longitudinal direction is 16:9.

When a corresponding image is displayed, as shown by the arrow S in FIG. 2(a), the scanning portion 20 repeats an operation of scanning a light flux in the first scanning direction A1 (the lateral direction of the image), and an operation of scanning a light flux in the second scanning direction A2 (the longitudinal direction of the image). At this time, the driving frequency of the scanning mirror 21 when scanning in the first scanning direction A1 (the lateral direction) is higher than the driving frequency of the scanning mirror 21 when scanning in the second scanning direction A2 (the longitudinal direction).

As shown in FIG. 2(b), for example, the scanning portion 20 includes a movable frame 22 that is disposed around the scanning mirror 21, two first rotational shafts 26 both ends of which are connected to the movable frame 22 and the scanning mirror 21, two second rotational shafts 27 both ends of which are connected to a fixing member (not illustrated in the drawings) and the movable frame 22, a first actuator (not illustrated in the drawings) that rotates the scanning mirror 21 around the first rotational shafts 26 with respect to the movable frame 22, and a second actuator (not illustrated in the drawings) that rotates the movable frame 22 around the second rotational shafts 27 with respect to the fixing member. The first rotational shafts 26 extend in the second scanning direction A2, and as shown by the arrow A10, a light flux is scanned in the first scanning direction A1 by rotating the scanning mirror 21 around the first rotational shafts 26 with respect to the movable frame 22. In contrast to this, the second rotational shafts 27 extend in the first scanning direction A1, and as shown by the arrow A20, a light flux is scanned in the second scanning direction A2 by rotating the movable frame 22 together with the scanning mirror 21 around the second rotational shafts 27.

In this instance, in the scanning mirror 21, a width W1 in the first scanning direction A1 differs from a width W2 in the second scanning direction A2. More specifically, for example, the scanning mirror 21 has an oval form or an elliptical form in which the major axis is directed toward the second scanning direction A2, and the width W1 in the first scanning direction A1 is narrower than the width W2 in the second scanning direction A2. Therefore, as shown in FIG. 2(c), in a light flux emitted from the scanning portion 20, the diameter in the first scanning direction A1 is smaller than the diameter in the second scanning direction A2 to correspond to the shape of the scanning mirror 21.

In addition, as shown in FIG. 2(d), in the display apparatus 10 of the present aspect, in the light flux diameter expanding element 30, the expanding magnification in the first expanding direction B1 differs from the expanding magnification in the second expanding direction B2. More specifically, in the light flux diameter expanding element 30, the expanding magnification in the first expanding direction B1 is greater than the expanding magnification in the second expanding direction B2. Therefore, in a light flux emitted from the scanning mirror 21, even in a case in which the diameter in the first scanning direction A1 is smaller than the diameter in the second scanning direction A2, in a light flux emitted from the light flux diameter expanding element 30, the diameter in the first expanding direction B1 (the first scanning direction A1) is greater than the diameter in the second expanding direction B2 (the second scanning direction A2). In this instance, in a light flux emitted from the light flux diameter expanding element 30, a ratio of the diameter in the first expanding direction B1 (the first scanning direction A1) to the diameter in the second expanding direction B2 (the second scanning direction A2) is equivalent to a ratio of the size (an angle range in the first incidence direction C1) in the lateral direction of an image to the size (an angle range in the second incidence direction C2) in the longitudinal direction. In the image shown in FIG. 2(a), from the fact that the ratio of the size in the lateral direction to the size in the longitudinal direction is 16:9, in a light flux emitted from the light flux diameter expanding element 30, the ratio of the diameter in the first expanding direction B1 (the lateral direction) to the diameter in the second expanding direction B2 (the longitudinal direction) is 16:9.

The light flux diameter expanding element 30 adopts either a configuration that expands the light flux diameter in both the first expanding direction B1 and the second expanding direction B2, or a configuration that expands only the light flux diameter in the first expanding direction B1 and does not expand the light flux diameter in the second expanding direction B2. Since the latter configuration is adopted in the present aspect, in the light flux diameter expanding element 30, the expanding magnification of light flux diameter in the first expanding direction B1 exceeds 1X, and the expanding magnification of light flux diameter in the second expanding direction B2 is 1X.

Additionally, a cross-section of a light flux emitted from the light flux diameter expanding element 30 may have a substantially rectangular shape as shown in FIG. 2(d), but may also have an oval form or an elliptical form as shown in FIG. 2(e).

(Specific Configuration Example of Light Flux Diameter Expanding Element 30)

FIG. 3 is an explanatory diagram that shows an aspect of a light flux diameter expanding element 30 that is used in the display apparatus 10 in which the embodiment is applied, and FIGS. 3(a) (b) are respectively an explanatory view that shows an aspect of a configuration of the light flux diameter expanding element 30, and an explanatory view of a light flux after the light flux diameter is expand.

As the light flux diameter expanding element 30 shown in FIG. 1, it is possible to use an optical element in which a translucent layer and a partially transmissive reflective layer are alternately stacked, an optical element provided with the diffraction elements 31 and 32 shown in FIG. 3, or the like.

In the light flux diameter expanding element 30 shown in FIG. 3, the two diffraction elements 31 and 32, in which the diffraction angles with respect to the same wavelength coincide, are disposed in parallel as a pair. Accordingly, a parallel light flux L1 is incident to the diffraction element 31, is divided into zero-order light, +primary light, and −primary light, and is incident to the diffraction element 32. Further, emitted light from the diffraction element 31 is diffracted again by the diffraction element 32, and a portion is emitted as a parallel light flux L. As a result of this, the light flux diameter is expand. In this instance, in the diffraction elements 31 and 32, lattices 310 and 320, which extend in the second expanding direction B2, are aligned in a plurality in parallel in the first expanding direction B1. Therefore, a light flux is expand in the first expanding direction B1. In addition, if two diffraction elements 31 and 32, in which diffraction angles with respect to the same wavelength coincide, are disposed in a plurality of pairs, it is possible to further increase the expanding magnification of a light flux diameter. Furthermore, if two diffraction lattices, in which a plurality of lattices that extends in the first expanding direction B1 are aligned in parallel in the second expanding direction B2, are used, a light flux is expand in the second expanding direction B2.

In the light flux diameter expanding element 30 in which such diffraction elements 31 and 32 are used, as shown in FIG. 3(b), there are cases in which a plurality of unit light fluxes L0 are emitted in a spatially separated manner, but an image is perceived by an user as a result of an aggregated body of a plurality of light fluxes being reflected toward the eye E in the deflection member 53 as a single light flux L.

(Main Effects of Present Aspect)

In the manner described above, in the retina scanning type display apparatus 10 of the present aspect, the incidence angle range in the first incidence direction C1 from the deflection member 53 to the eye E is broader than the incidence angle range in the second incidence direction C2, and therefore, an image that is recognized by an user is horizontally long. Therefore, as described with reference to FIG. 4, when the eye E is directed toward one end in the first incidence direction C1 (the lateral direction), the eye E moves greatly in comparison with when the eye E is directed toward one end in the second incidence direction C2 (the longitudinal direction). Even in such a case, in the present aspect, in the light flux diameter expanding element 30, since the expanding magnification of light flux diameter in the first expanding direction B1 is greater than the expanding magnification of light flux diameter in the second expanding direction B2, the light flux diameter in the first expanding direction B1 (the first incidence direction C1) is greater than the light flux diameter in the second expanding direction B2 (the second incidence direction C2). Accordingly, even when the eye E is directed toward one end in the first incidence direction C1 (the lateral direction), it is possible to cause the light flux L that is equivalent to the other end in the first incidence direction C1 of an image, to be incident to the pupil E1. Therefore, it is possible to suppress the occurrence of a circumstance in which the end portions in the first incidence direction C1 of an image become chipped, and a circumstance in which the end portions in the first incidence direction C1 of an image are dark, or the like.

In addition, in the present aspect, since the light flux diameter in the lateral direction (the first incidence direction C1) is greater than the light flux diameter in the longitudinal direction (the second incidence direction C2), it is possible to immediately recognize an image at a point in time at which the display apparatus 10 is mounted. That is, the light flux diameter is small in the longitudinal direction, but since a position in the longitudinal direction of the display apparatus 10 is established immediately by a nose pad, or the like, of the display apparatus 10, a light flux is immediately incident to the pupil E1 of the eye E. In contrast to this, a position in the lateral direction of the display apparatus 10 is not established by a nose pad, or the like, of the display apparatus 10, but since the light flux diameter in the lateral direction is large, even in a case in which the display apparatus 10 and the eye E are shifted in the lateral direction, a light flux is incident to the pupil E1 of the eye E. Therefore, it is possible to immediately recognize an image at a point in time at which the display apparatus 10 is mounted.

In addition, in the present aspect, since the width in the first scanning direction A1 is narrower than the width in the second scanning direction A2, in the scanning mirror 21, the diameter of a light flux emitted from the scanning mirror 21 is small in the first scanning direction A1, but since the light flux diameter expanding element 30 greatly expands the diameter in the first expanding direction B1, which corresponds to the first scanning direction A1, the diameter of the light flux is made sufficiently large in two directions (the first expanding direction B1 and the second expanding direction B2).

In this instance, in the scanning portion 20, the driving frequency of the scanning mirror 21 in the first scanning direction A1 is higher than the driving frequency of the scanning mirror 21 in the second scanning direction A2, and therefore, in the scanning mirror 21, the width in the first scanning direction A1 is narrow in order to correspond to the corresponding configuration. Accordingly, the inertia of the scanning mirror 21 during scanning in the first scanning direction A1 is small. Therefore, since it is unlikely that a circumstance in which scanning becomes irregular due to the effects of inertia of the scanning mirror 21 during scanning of the scanning mirror 21 in the first scanning direction A1, will occur, it is possible to suppress a deterioration in the image appearance quality caused by inertia of the scanning mirror 21.

In addition, in the light flux diameter expanding element 30, the expanding magnification of light flux diameter in the first expanding direction B1 exceeds 1X, and the expanding magnification of light flux diameter in the second expanding direction B2 is 1X. Accordingly, since it is not necessary for the light flux diameter expanding element 30 to expand the light flux diameter in the second expanding direction B2, it is possible to achieve miniaturization and cost-reduction in the light flux diameter expanding element 30.

In addition, in the display apparatus 10 of the present aspect, since the deflection member 53 is provided with the reflective surface 530 composed of a concave curved surface, it is possible to reliably reflect a light flux toward the eye E of a user using a simple configuration. In addition, since the deflection member 53 is a partially transmissive reflective combiner, it is possible to configure the display apparatus 10 as a see-through type head mounted display (an eye glass display), and therefore, it is possible to simultaneously view external light that is transmitted by the combiner, and image light that is incident from the pupil E1 of the eye E of an user.

[Other Display Apparatuses]

In the abovementioned embodiment, modulated light is emitted from the light source portion 51 is scanned using the scanning portion 20. However, a configuration in which a liquid crystal panel is irradiated with unmodulated light that is emitted from the light source portion 51 while scanning using the scanning portion 20, and modulated light that is emitted from the liquid crystal panel is reflected by the deflection member 53, may be adopted.

In the above-mentioned embodiment, a case in which an image is horizontally long is described, but the embodiment may also be applied to a case in which an image is vertically long.

In the above-mentioned embodiment, in the scanning portion 20, scanning is performed in the first scanning direction A1 and the second scanning direction A2 by a single scanning mirror 21, but the embodiment may also be applied to a case in which two scanning mirrors are provided, scanning in the first scanning direction A1 is performed by one scanning mirror, and scanning in the second scanning direction A2 is performed by the other scanning mirror.

The entire disclosure of Japanese Patent Application No. 2014-220042, filed Oct. 29, 2014 is expressly incorporated by reference herein.

The invention claimed is:

1. A retina scanning type display apparatus comprising:
   a light source portion that emits a light flux for displaying an image;
   a scanning portion provided with a scanning mirror that scans the light flux emitted from the light source portion in both a first scanning direction and a second scanning direction that intersects the first scanning direction;

a light flux diameter expanding element that expands a diameter of the light flux that is scanned by the scanning portion; and a deflection member that deflects the light flux that is expanded by the light flux diameter expanding element, and causes the light flux that is deflected by the deflection member to be incident to an eye of a user along a first incidence direction, which corresponds to the first scanning direction, and a second incidence direction, which corresponds to the second scanning direction, wherein:

an incidence angle range with respect to the eye in the first incidence direction is broader than an incidence angle range with respect to the eye in the second incidence direction;

the first incidence direction is a lateral direction in which both eyes are aligned;

the second incidence direction is a longitudinal direction that is orthogonal to the direction in which both eyes are aligned;

in the scanning mirror, a width in the first scanning direction corresponding to the first incidence direction is narrower than a width in the second scanning direction corresponding to the second incidence direction;

in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction; and the light flux diameter expanding element changes a shape of the light flux emitted from the scanning portion after being scanned in both the first scanning direction and the second scanning direction, such that:
- a cross section of the light flux emitted from the scanning portion and not yet expanded by the light flux diameter expanding element has a width in the first incidence direction smaller than a width in the second incidence direction; and
- a cross section of the light flux expanded by the light flux diameter expanding element has a width in the first incidence direction greater than a width in the second incidence direction.

2. The display apparatus according to claim 1, wherein:
in the scanning portion, a driving frequency of the scanning mirror in the first scanning direction is higher than a driving frequency of the scanning mirror in the second scanning direction.

3. The display apparatus according to claim 1, wherein:
in the light flux diameter expanding element, the expanding magnification of light flux diameter in the first expanding direction exceeds 1X, and the expanding magnification of light flux diameter in the second expanding direction is 1X.

4. The display apparatus according to claim 1, wherein the deflection member is provided with a reflective surface having a concave curved surface.

5. The display apparatus according to claim 4, wherein the deflection member is a partially transmissive reflective combiner.

6. The display apparatus according to claim 1, wherein the deflection member is a hologram that deflects light incident thereto using diffraction.

7. The display apparatus according to claim 1, wherein:
the light flux emitted from the light source is to be incident to a pupil of the eye of the user wearing the retina scanning type display apparatus;
a first incidence angle range with respect to the pupil in the first incidence direction is broader than a second incidence angle range with respect to the pupil in the second incidence direction; and
the light diameter expanding element changes the shape of the light flux so that, when the eye of the user is directed toward one end of the first incidence angle range in the first incidence direction, the light flux corresponding to the other end of the first incidence angle range in the first incidence direction is incident to the pupil.

8. A retina scanning type display apparatus comprising:
a light source portion that emits a light flux for displaying an image;
a scanning portion provided with a scanning mirror that scans the light flux emitted from the light source portion in both a first scanning direction and a second scanning direction that intersects the first scanning direction;
a light flux diameter expanding element that expands a diameter of the light flux that is scanned by the scanning portion; and
a deflection member that deflects the light flux that is expanded by the light flux diameter expanding element, and causes the light flux that is deflected by the deflection member to be incident to an eye of a user along a first incidence direction, which corresponds to the first scanning direction, and a second incidence direction, which corresponds to the second scanning direction, wherein:
the first incidence direction is a lateral direction in which both eyes are aligned;
the second incidence direction is a longitudinal direction that is orthogonal to the direction in which both eyes are aligned;
in the scanning portion, a driving frequency of the scanning mirror in the first scanning direction is higher than a driving frequency of the scanning mirror in the second scanning direction;
in the scanning mirror, a width in the first scanning direction corresponding to the first incidence direction is narrower than a width in the second scanning direction corresponding to the second incidence direction; and
the light flux diameter expanding element changes a shape of the light flux emitted from the scanning portion after being scanned in both the first scanning direction and the second scanning direction, such that:
- a cross section of the light flux emitted from the scanning portion and not yet expanded by the light flux diameter expanding element has a width in the first incidence direction smaller than a width in the second incidence direction; and
- a cross section of the light flux expanded by the light flux diameter expanding element has a width in the first incidence direction greater than a width in the second incidence direction.

9. The display apparatus according to claim 8, wherein:
in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction.

10. The display apparatus according to claim 8, wherein:
in the light flux diameter expanding element, the expanding magnification of light flux diameter in the first expanding direction exceeds 1X, and the expanding magnification of light flux diameter in the second expanding direction is 1X.

11. A retina scanning type display apparatus comprising:
a light source portion that emits a light flux for displaying an image;
a scanning portion provided with:
  a scanning mirror that scans the light flux emitted from the light source portion in both a first scanning direction and a second scanning direction that intersects the first scanning direction;
  a movable frame disposed around the scanning mirror; and
  two first rotational shafts each connecting the scanning mirror to the movable frame;
a light flux diameter expanding element that expands a diameter of the light flux that is scanned by the scanning portion; and
a deflection member that deflects the light flux that is expanded by the light flux diameter expanding element, wherein:
an image formed by the light flux emitted from the deflection member and incident on a user's eye is longer in a lateral direction than in a longitudinal direction; and
in the scanning mirror, a width in the first scanning direction corresponding to the lateral direction is narrower than a width in the second scanning direction corresponding to the longitudinal direction.

12. The retina scanning type display apparatus according to claim 11, wherein:
the light flux that is deflected by the deflection member is incident to the user's eye along a first incidence direction, which corresponds to the lateral direction of the image and the first scanning direction, and a second incidence direction, which corresponds to the longitudinal direction of the image and the second scanning direction.

13. The retina scanning type display apparatus according to claim 12, wherein:
in the light flux diameter expanding element, an expanding magnification of light flux diameter in a first expanding direction, which corresponds to the first incidence direction, is greater than an expanding magnification of light flux diameter in a second expanding direction, which corresponds to the second incidence direction.

14. The retina scanning type display apparatus according to claim 11, further comprising:
in the scanning mirror, two second rotational shafts with one end of each being connected to the movable frame.

15. The retina scanning type display apparatus according to claim 14, wherein:
the two first rotational shafts extend in the second scanning direction; and
the two second rotational shafts extend in the first scanning direction.

* * * * *